Figure 1:
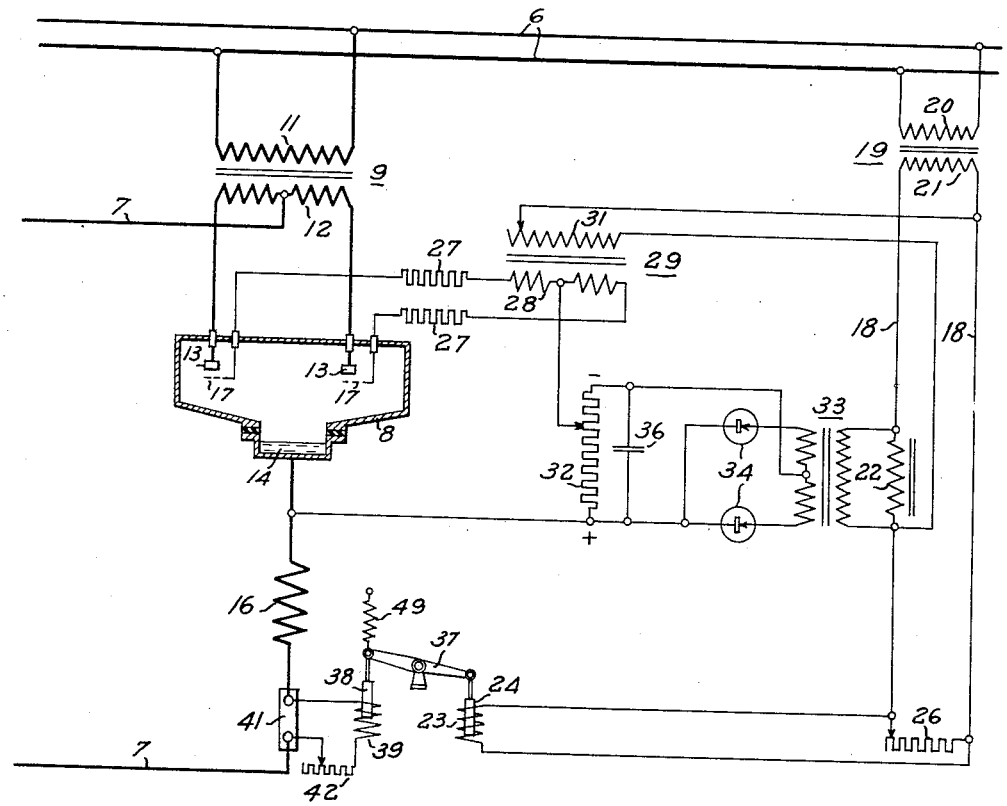

Dec. 7, 1937.  H. WINOGRAD  2,101,802
RECTIFYING SYSTEM
Filed June 18, 1934  3 Sheets-Sheet 1

Inventor
H. Winograd
by G. T. Delvin
Attorney

Dec. 7, 1937.  H. WINOGRAD  2,101,802
RECTIFYING SYSTEM
Filed June 18, 1934   3 Sheets-Sheet 2

Inventor
H. Winograd
by G. B. Salvin
Attorney

Patented Dec. 7, 1937

2,101,802

UNITED STATES PATENT OFFICE

2,101,802

RECTIFYING SYSTEM

Harold Winograd, Milwaukee, Wis., assignor to Allis-Chalmers Manufacturing Company, Milwaukee, Wis., a corporation of Delaware Application June 18, 1934, Serial No. 731,105

15 Claims. (Cl. 175—363)

This invention relates in general to improvements in electric valve control systems and more particularly to means for impressing variable alternating and direct voltage components on the control electrode of an electric valve to control the operation thereof.

It is frequently desired to control the flow of current through an electric valve connected with an alternating current circuit by impressing superimposed alternating and direct voltage components on the control electrodes of the valve. Each control electrode is then alternately made negative and positive with respect to the cathode potential and the moment of positive energization of each control electrode may be varied by varying either the alternating or the direct voltage component to thereby regulate the output of the valve. To obtain a large range of regulation it is then necessary to vary the magnitude of the direct component or to vary the magnitude or the phase of the alternating component of the control electrode voltage to a large extent with the result that the system lacks sensitiveness and the degree of regulation obtainable is limited. By simultaneously varying the direct and alternating components of the control electrode voltage the sensitiveness of the system may be greatly increased and the range of regulation obtainable with a given system is also enlarged.

It is therefore one of the objects of the present invention to provide a control system for an electric valve in which the control electrode of the valve receives superimposed variable alternating and direct voltage components.

Another object of the present invention is to provide a control system for an electric valve in which the components of the control electrode voltage of the valve are automatically varied in response to an operating condition of the valve.

Another object of the present invention is to provide a control system for an electric valve in which the alternating and direct voltage components of the control electrode are conversely varied in magnitude.

Another object of the present invention is to provide a control system for an electric valve in which the alternating component of the control electrode voltage is varied in phase and the direct component of such voltage is simultaneously varied in magnitude.

Figure 3:
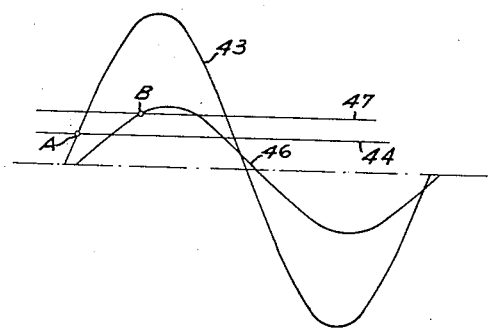
Figure 2:
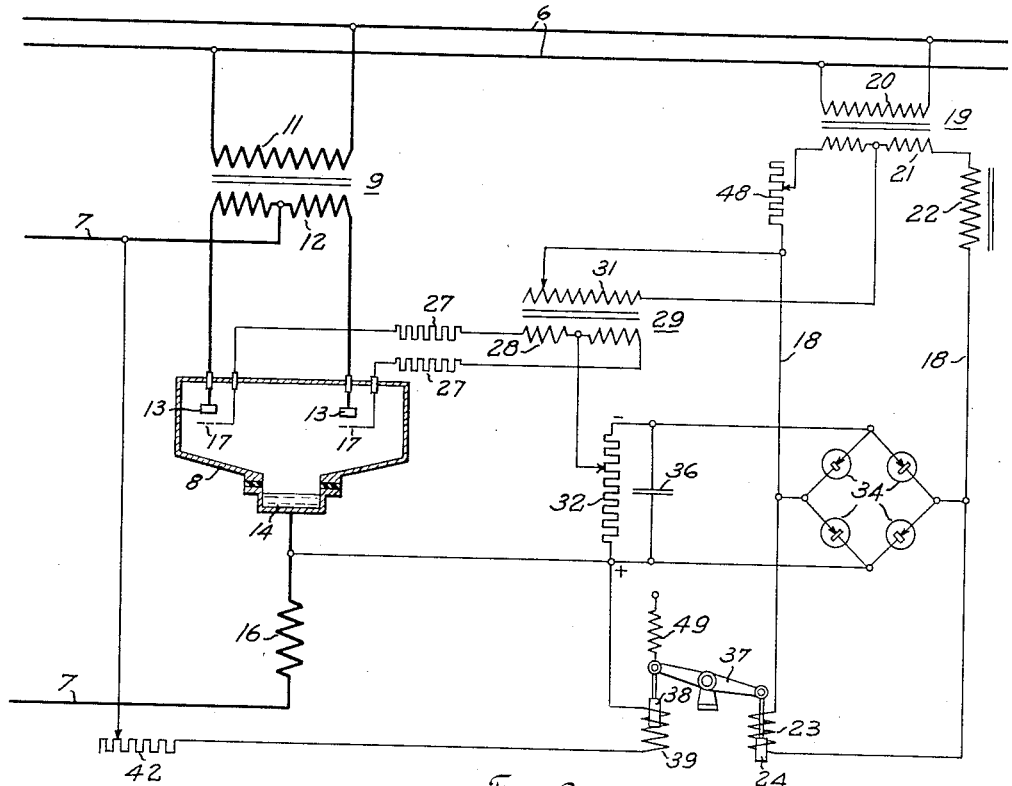
Figure 4:
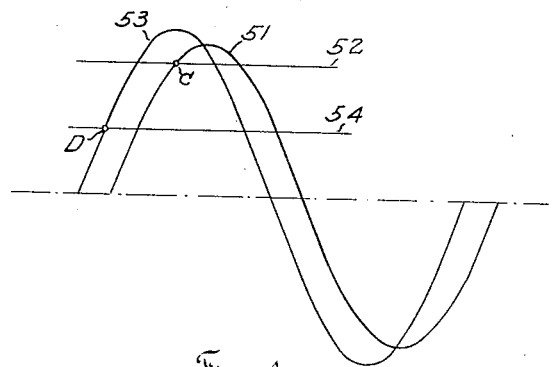
Figure 5:
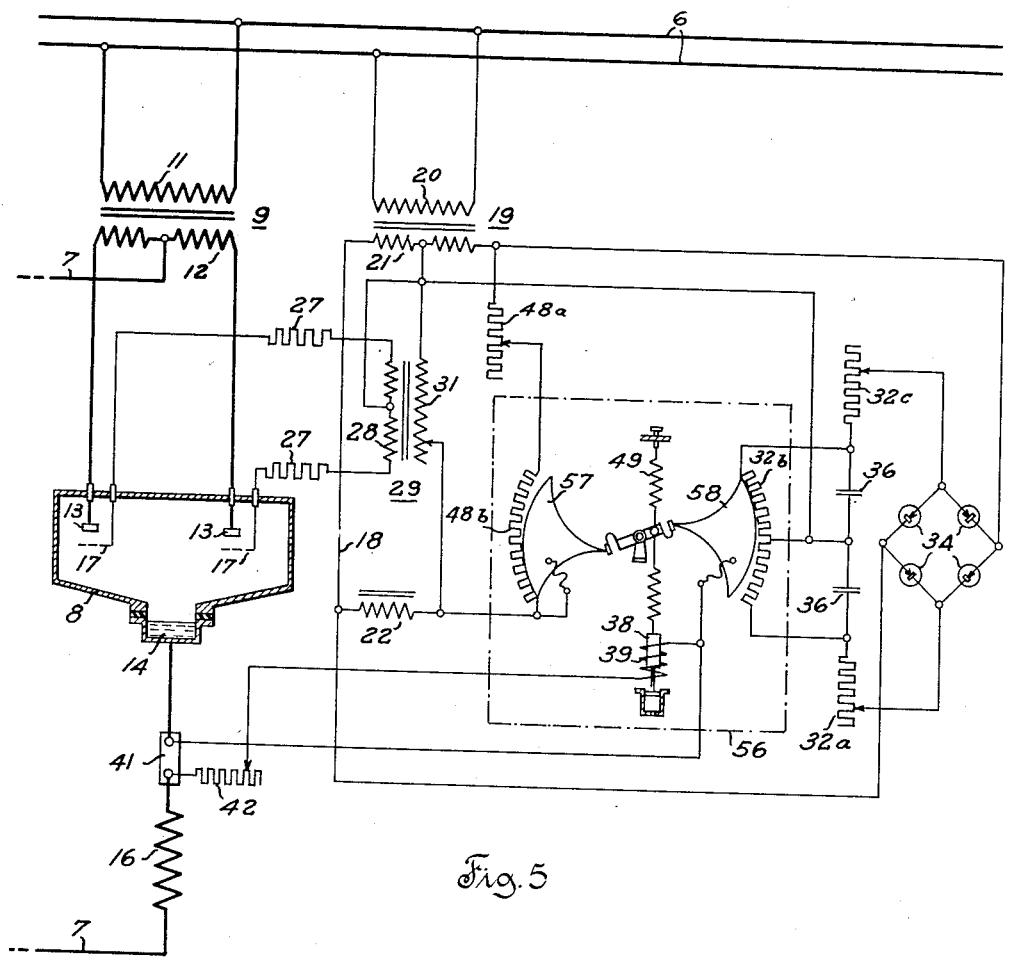

Objects and advantages other than those above described will be apparent to those skilled in the art from a consideration of the following description when read in connection with the accompanying drawings, in which:

Fig. 1 diagrammatically illustrates one embodiment of the present invention applied to the regulation of an electric valve controlling the flow of energy between alternating current and direct current lines and operating in response to the magnitude of the flow of current through the valve;

Fig. 2 diagrammatically illustrates a modified embodiment of the present invention differing from the embodiment illustrated in Fig. 1 in the arrangement of the control electrode circuit and operating in response to the magnitude of the output voltage of the valve;

Figs. 3 and 4 are diagrams of the control electrode voltage component utilized in the systems illustrated in Figs. 1 and 2 respectively; and Fig. 5 diagrammatically illustrates another modified embodiment of the present invention differing from the embodiment illustrated in Fig. 2 in the choice of the circuit elements varied by the action of the regulator.

Referring more particularly to the drawings by characters of reference, Fig. 1 illustrates a system for transmitting electrical energy between an alternating current line 6 and the direct current line 7 through an electric valve 8. In the present embodiment it will be assumed that current supplied from line 6 is to be rectified and supplied to line 7 and the system will be described accordingly, although it will be understood that the converse operation may be obtained by means of the system shown by suitably adjusting the circuit of the control electrodes of the valve 8. The system includes a supply transformer 9 having a primary winding 11 connected with line 6 and a secondary winding 12 having a midtap connected with one of the conductors of line 7. The terminals of winding 12 are severally connected with the anodes 13 of valve 8 and the cathode 14 of the valve is connected with the second conductor of line 7. If cathode 14 is of the reconstructing fluid type diagrammatically illustrated in the drawings, valve 8 is provided with the usual discharge igniting and maintaining means which are well known and therefore not shown. The connection between cathode 14 and line 7 may be direct or through a reactor 16. The action of such reactor is to cause the current to flow through each anode not only during the positive period of the anode voltage but also to flow during any subsequent negative portion of the anode voltage previous to the release of the flow of current through another anode. The average output voltage of the valve is then decreased by an amount depending on the length of the period of negative voltage utilized and the range of regulation obtainable by a predetermined amount of delay of the release of the flow of current through each anode is thereby increased to a material extent.

The flow of current through each anode 13 is controlled by means of a control electrode 17 energized from a circuit 18 receiving an alternating current voltage, similar to the voltage of winding 12, from the secondary windings 21 of an auxiliary transformer 19 having the primary windings 29 thereof connected with line 6. In addition to winding 21 circuit 18 contains a plurality of impedance elements including a fixed reactor 22 and a variable reactor 23. The inductance of reactor 23 may be adjusted by movement of core 24 thereof. The relations of phase and of magnitude between the voltage of winding 21 and the voltages of reactors 22 and 23 may be varied by means of a rheostat 26 connected in parallel with reactor 23. Control electrodes 17 are connected with circuit 18 through current limiting resistors 27 which are connected with the secondary winding 28 of a transformer 29 having a primary winding 31 thereof connected in parallel with reactor 23. Winding 28 is provided with a midtap connected with cathode 14 through a voltage divider 32; the latter is energized at a direct voltage component from a transformer 33 connected across reactor 22 and a pair of rectifying devices 34 converting the alternating secondary voltage of transformer 33 into a substantially uniform direct current voltage. Such voltage may be given any desired degree of uniformity by suitable filtering means which may consist simply of a capacitor 36 connected across voltage divider 32. The magnitude of the alternating voltage components received by control electrodes 17 may be adjusted in any suitable manner such as for instance by means of taps provided in winding 31. The adjustment of circuit 18 may be effected by movement of core 24 of reactor 23 as a result of the connection of such core with the lever of a regulator 37 provided with a second core 38 movable in a solenoid 39 energized from line 7 through a shunt 41 and a rheostat 42.

In operation, the system being connected as shown and line 6 being energized, circuit 18 is energized from winding 21 at an alternating voltage similar to the voltage of winding 12. The voltages appearing across the terminals of reactor 22 and of reactor 23 are then geometrical components of the voltage of winding 21, of magnitudes and phases depending on the magnitudes of the inductances of reactors 22 and 23 and on the resistances of rheostat 26 and of voltage divider 32. Transformer 29 having winding 31 thereof connected across reactor 23 cooperates with voltage divider 32 to impress an alternating voltage component between each control electrode 17 and cathode 14 similar to the voltage across reactor 23. The rectifying system comprising transformer 33, devices 34, capacitor 36 and voltage divider 32 superposes on the alternating voltage component of the control electrode a substantially uniform direct component of magnitude in relation of substantial proportionality with the magnitude of the voltage of reactor 22. Circuit 18 is so adjusted that the magnitude of such components are effective to cause control electrode 17 to control the operation of anode 13 associated therewith. During the operation of valve 8 each anode 13 thereof alternately receives positive and negative voltage waves from winding 12, and the voltage components impressed on the associated control electrode are such that such electrode passes from a negative voltage to a positive voltage when the anode is positive with respect to the cathode to release the flow of current therethrough. The current impulses sequentially released through the anodes of the valve 8 combine at the cathode 14 to form a substantially uniform direct current of magnitude depending on the voltage of winding 12, on the time of the voltage cycle at which the flow of current is released through each anode and on the impedance of the load.

The value of the impedance of the load is to be considered instead of only the resistance thereof because, as pointed out above, the extent of the flow of current through valve 8 and the average output voltage of the valve are dependent upon the inductance of the load circuit as well as upon its resistance. If the load impedance is high the current through line 7 and through solenoid 39 is small and the attraction of solenoid 39 on core 38 is overcome by the tension of spring 49 and the attraction of reactor 23 on core 24 thereof. Core 24 accordingly moves inward, thereby causing the inductance of reactor 23 to reach a high value. The component of the voltage of winding 21 appearing across reactor 23 is therefore large while the component appearing across reactor 22 is small. The alternating component of the voltage of one of control electrodes 17 which is proportional to the voltage of reactor 23 may then be represented by curve 43 in Fig. 3. This curve is to be read with respect to a line 44 of which the positive ordinate is of a value representing the negative direct component of the control electrode voltage of value substantially proportional to the magnitude of the voltage of reactor 22 and superposed on the alternating component by means of voltage divider 32. Curve 43 and line 44 intersect at a point A indicating the passage of the control electrode from negative values to positive values of voltage with respect to cathode 14, to thereby release the flow of current through the associated anode at substantially the instant represented by point A.

If on the contrary the load impedance is low in value, the current through line 7 and through coil 39 is at a high value and the attraction of coil 39 on core 38 overcomes the attraction of spring 49 and reactor 23 on core 24. Core 24 accordingly moves upward thereby causing the inductance of reactor 23 to be reduced in value. The voltage across reactor 23 accordingly decreases in magnitude and varies in phase in a manner depending upon the adjustment of the several elements of circuit 18. In general it will be preferred to adjust resistor 26 to a comparatively low value so that when the voltage of reactor 23 decreases in magnitude, such voltage also lags in phase to cause the control electrode 17 under consideration to receive an alternating voltage component represented by curve 46 in Fig. 3. While the voltage of reactor 23 decreases the voltage of resistor 32 increases, thereby causing the direct voltage component of the control electrode to increase so that curve 46 is to be read with respect to a line 47 having a positive ordinate representing the increased negative voltage impressed on control electrode 17 through voltage divider 32. Curve 46 intersects line 47 at point B at a moment in the voltage cycle later than the moment represented by the point A. The flow of current through each anode is thus released at a later part of the voltage cycle and such action tends to decrease the flow of current through valve 8 and thus opposes the increase of such flow of current resulting from the change of the load impedance. It will be apparent that regulator 37 may be so adjusted that such action causes the flow of current through valve 8 to be maintained at a substantially uniform value regardless of the value of the load impedance, or causes the magnitude of such flow of current to be in any desired relation with the magnitude of the load current.

Regulator 37 thus acts in response to an operating condition of valve 8, which is the magnitude of the flow of current therethrough, to vary the adjustment of circuit 18 by controlling the inductance of reactor 23 included therein. The result of such action is to conversely vary the magnitude of the control electrode voltage components to regulate the flow of current through valve 8, the phase of the alternating component being also retarded or advanced when the magnitude of the direct component is increased or decreased.

In the embodiment illustrated in Fig. 2, circuit 18 includes a rheostat 48 in addition to reactors 22 and 23. Winding 21 is provided with a midtap and winding 31 is connected between such midtap and the junction point of reactor 23 with rheostat 48. Transformer 29 therefore impresses between each control electrode 17 and cathode 14, an alternating voltage component proportional to the aggregate voltage of one half of winding 21 and of rheostat 48. Rectifying devices 34 are shown as being four in number and as being connected across reactor 23 without interposition of a transformer, such connection being equivalent to the connection illustrated in Fig. 1 as is well known in the art. In the present embodiment the connections are such that the rectifying system superposes on the alternating voltage component of the control electrode, a substantially uniform direct voltage component substantially proportional to the magnitude of the voltage across reactor 23. Coil 39 and rheostat 42 are connected across line 7 whereby regulator 37 is made responsive to the magnitude of the output voltage of valve 8. Regulator 37 is so arranged that cores 24 and 38 simultaneously move in or out of the associated coils, the attraction of the coils on the associated cores then being additive and being opposed by suitable restraining means such as a spring 49.

In operation, the system functions generally in the same manner as the system illustrated in Fig. 1. The voltage of winding 21 is divided into components appearing across reactors 22 and 23 and across rheostat 48, such components being of magnitudes and phases depending upon the inductances of reactors 22 and 23 and upon the resistances of rheostat 48 and of voltage divider 32. If the load impedance is of high value, the flow of current through line 7 is at a low value and the voltage drop occurring in transformer 9 and valve 8 is likewise of a low value. The output voltage of valve 8 impressed on coil 39 and rheostat 42 is then high so that the attraction of coil 39 on core 38 overcomes the action of spring 49 to move core 24 in coil 23. The inductance of reactor 23 is then high and reactor 23 will receive a large voltage component while rheostat 48 will receive a comparatively small component. The alternating voltage component received by a control electrode 17 is then substantially proportional to the voltage of one-half of winding 21, such component being represented by curve 51 in Fig. 4. Such curve is to be read with respect to line 52 representing the large direct current voltage component obtained by rectification of the voltage of reactor 23. Curve 51 and line 52 intersect at point C representing the instant at which the flow of current is released through the anode associated with the control electrode. If the load impedance becomes low, the flow of current through line 7 reaches a higher value and the voltage drop in transformer 9 and valve 8 increases. The output voltage of valve 8 decreases to a corresponding extent and the attraction of coil 39 on core 38 is overcome by the action of spring 49 which causes core 24 to be moved out of coil 23. The inductance of reactor 23 is thereby decreased and the voltage across the reactor decreases while the voltage of rheostat 48 increases. The alternating component of the control electrode voltage accordingly increases slightly in magnitude and is caused to advance considerably with respect to the voltage of winding 21, the resulting voltage being represented by curve 53 in Fig. 4. Such curve is to be read with respect to line 54 having the ordinate thereof lower than the ordinate of line 52 to an extent corresponding to the decrease in the voltage of reactor 23. Curve 53 and line 54 intersect at point D corresponding to the instant of the voltage cycle at which the flow of current is released through each anode. Point D being earlier than point C the release of the flow of current through each anode is advanced with respect to the voltage cycle and the output voltage of valve 8 is increased thus tending to offset the decrease thereof resulting from the greater value of the flow of current. Depending upon the adjustment of regulator 37 the flow of current through valve 8 may be regulated in such a manner that the output voltage of the valve is maintained at a substantially constant value or may be made to take values in any desired relation with the magnitude of the load current.

It may sometimes be desired to vary the point of release of the flow of current through each anode 19 during the voltage cycle to an extent greater than is possible in the above described embodiments. For example, it may be desired to automatically obtain alternate rectifying and inverting operation of valve 8 in response to an operating condition of the system, as when the valve supplies current to direct current motors which are so operated as to reverse their counter-electromotive forces to transmit to the supply line energy supplied thereto in mechanical form. When the system comprises two or more serially connected valves similar to valve 8, one of the valves may also operate alternately as a rectifier and as an inverter to thereby obtain a large regulating range without controlling the output voltage of all the valves. The system may then be connected as shown in Fig. 5, in which transformer 29 is connected as in Fig. 2. In the present embodiment, resistor 48 comprises two portions 48a and 48b of which portion 48b constitutes a portion of a regulator 56 also comprising solenoid 39, core 38 and spring 49. Core 38 acts on a movable tap 57 operable to short circuit a variable portion of resistor 48b in response to the magnitude of the flow of current in line 7. Rectifying devices 34 are directly connected with winding 21 of transformer 19 to impress on voltage divider 32 a substantially uniform and constant direct current voltage. The voltage divider comprises portions 32a, 32b and 32c of which portion 32b is included in regulator 56 and is variably connected with cathode 14 by means of a movable tap 58 actuated by core 38. An adjustable tap on resistor 32b is connected with the midtaps of windings 21 and 28, whereby control electrodes 17 receive a unidirectional voltage component equal to the voltage drop in the portion of resistor 32b comprised between the movable tap and the adjustable tap.

In operation, if the load impedance is of high value, the flow of current through line 7 will tend to have a low value, and the action of solenoid 39 on core 38 will be overcome by the tension of spring 49 to an extent causing regulator 56 to reach a position approximating the position shown in the drawings. A large portion of resistor 48b is then effective, thereby causing the alternating voltage components impressed on the control electrodes from transformer 29 to advance with respect to the voltage of winding 21. At the same time, cathode 14 is connected by tap 58 with the negative portion of resistor 32b, so that the control electrodes receive a large positive unidirectional voltage component of a magnitude depending on the position of the adjustable tap of resistor 32b. Each control electrode therefore becomes positive at an early part of the positive half-cycle of the associated anode, and the flow of current is thereby caused to occur at the value for which the regulator is adjusted. If the load impedance decreases, the flow of current through line 7 tends to increase and causes regulator 56 to move towards the limit position thereof opposite to the position shown. Such movement causes an increased portion of resistor 48b to be short circuited, whereby the voltage of transformer 29 is caused to lag while remaining constant in magnitude, and also results in movement of tap 58 to decrease or even reverse the positive unidirectional voltage component of the control electrodes. The flow of current is then released through each anode at a later point of the positive half-cycle thereof, and the flow of current is returned to the value for which the regulator is adjusted.

The regulator may be so adjusted as not to reach the limit position thereof opposite to the position shown even if the load impedance becomes nil. The current consuming devices, such as direct current motors connected with line 7, or any suitable direct current generators, may then be operated to supply current to valve 8 without reversing the direction of current flow therethrough. Such motors or generators are then so operated as to reverse the voltage of line 7, and the flow of current therethrough tends to increase as the output voltage of valve 8 and the motor or generator voltage are then additive. The regulator then moves in the same way as outlined above to further retard the times of release of the anode currents which then flow during the negative half-cycles of the anode voltages to return energy from line 7 to line 6, as is well known in the art. Under such operating conditions the regulator still operates correctly to retard the anode currents when the current through line 7 is too high and to advance the anode currents when the current through line 7 is too low.

Although but a few embodiments of the present invention have been illustrated and described it will be apparent to those skilled in the art that various changes and modifications may be made therein without departing from the spirit of the invention or from the scope of the appended claims.

It is claimed and desired to secure by Letters Patent:

1. In an electric translating system, the combination with an electric valve comprising a cathode, an anode and a control electrode, and a circuit for said control electrode comprising a source of alternating current for impressing therefrom superimposed alternating and direct voltage components between said control electrode and cathode to control the operation of said valve, of means for simultaneously varying the phase and magnitude of said alternating voltage component and the magnitude of the said direct voltage component independently of the magnitude of the voltage of said source to thereby regulate the flow of current through said valve.

2. In an electric translating system, an electric valve having an anode with an associated control electrode and a cathode, and a control electrode circuit for said valve comprising a source of alternating current for impressing therefrom superimposed alternating and direct voltage components between said control electrode and said cathode to control the operation of said valve, and means responsive to an operating condition of said valve for simultaneously varying said voltage components independently of the magnitude of the voltage of said source to regulate the flow of current through said valve.

3. In an electric translating system, an electric valve having an anode with an associated control electrode and a cathode, and a control electrode circuit for said valve comprising a source of alternating current for impressing therefrom superimposed alternating and direct voltage components between said control electrode and said cathode to control the operation of said valve, and means responsive to the magnitude of the flow of current through said valve for simultaneously varying said voltage components independently of the magnitude of the voltage of said source to regulate the flow of current through said valve.

4. In an electric translating system, an electric valve having an anode with an associated control electrode and a cathode, and a control electrode circuit for said valve comprising a source of alternating current for impressing therefrom superimposed alternating and direct voltage components between said control electrode and said cathode to control the operation of said valve, and means responsive to the magnitude of the output voltage of said system for simultaneously varying said voltage components independently of the magnitude of the voltage of said source to regulate the flow of current through said valve.

5. In an electric translating system, an electric valve having an anode with an associated control electrode and a cathode, and a control electrode circuit for said valve including means for impressing superimposed alternating and direct voltage components between said control electrode and said cathode to control the operation of said valve, and means for conversely varying the magnitudes of said voltage components to regulate the flow of current through said valve.

6. In an electric translating system, an electric valve having an anode with an associated control electrode and a cathode, and a control electrode circuit for said valve including means for impressing superimposed alternating and direct voltage components between said control electrode and said cathode to control the operation of said valve, and means operable for simultaneously increasing the magnitude of said direct voltage component and retarding the phase of said alternating voltage component and for simultaneously decreasing the magnitude of said direct voltage component and advancing the phase of said alternating voltage component to control the flow of current through said valve.

7. In an electric translating system, an alternating current winding, an electric valve connected with said winding and having an anode with an associated control electrode and a cathode, and a circuit connected for receiving a periodic voltage similar to a voltage of said winding and including a plurality of impedance elements, means connected with one of said impedance elements for impressing an alternating voltage component from said circuit between said control electrode and said cathode, rectifying means connected across another of said impedance elements for superposing on the alternating voltage component a substantially uniform direct voltage component, and means for varying the adjustment of said circuit.

8. In an electric translating system, an alternating current winding, an electric valve connected with said winding and having an anode with an associated control electrode and a cathode, and a circuit connected for receiving a periodic voltage similar to a voltage of said winding and including a plurality of impedance elements, means connected with one of said impedance elements for impressing an alternating voltage component from said circuit between said control electrode and said cathode, rectifying means connected across another of said impedance elements for superposing on the alternating voltage component a substantially uniform voltage component, and means for varying one of said impedance elements whereby the voltage components are simultaneously varied to regulate the flow of current through said valve.

9. In an electric translating system, an alternating current winding, an electric valve connected with said winding and having an anode with an associated control electrode and a cathode, and a circuit connected for receiving a periodic voltage similar to a voltage of said winding and including a plurality of impedance elements, means connected with one of said impedance elements for impressing an alternating voltage component from said circuit between said control electrode and said cathode, rectifying means connected across another of said impedance elements for superposing on the alternating voltage component a substantially uniform direct voltage component, and means responsive to an operating condition of said valve for varying one of said impedance elements whereby the voltage components are simultaneously varied to regulate the flow of current through said valve.

10. In an electric translating system, an alternating current winding, an electric valve connected with said winding and having an anode with an associated control electrode and a cathode, and a circuit connected for receiving a periodic voltage similar to a voltage of said winding and including a plurality of impedance elements, means connected with one of said impedance elements for impressing an alternating voltage component from said circuit between said control electrode and said cathode, rectifying means connected across another of said impedance elements for superposing on the alternating voltage component a substantially uniform direct voltage component, and means responsive to the magnitude of the flow of current through said valve for varying one of said impedance elements whereby the voltage components are simultaneously varied to regulate the flow of current through said valve.

11. In an electric translating system, an alternating current winding, an electric valve connected with said winding and having an anode with an associated control electrode and a cathode, and a circuit connected for receiving a periodic voltage similar to a voltage of said winding and including a plurality of impedance elements, means connected with one of said impedance elements for impressing an alternating voltage component from said circuit between said control electrode and said cathode, rectifying means connected across another of said impedance elements for superposing on the alternating voltage component a substantially uniform direct voltage component, and means responsive to the magnitude of the output voltage of said system for varying one of said impedance elements whereby the voltage components are simultaneously varied to regulate the flow of current through said valve.

12. In an electric translating system, an alternating current winding, an electric valve connected with said winding and having an anode with an associated control electrode and a cathode, and a circuit connected for receiving an alternating voltage similar to a voltage of said winding and including a plurality of serially connected reactors, means for impressing an alternating voltage component between said control electrode and said cathode similar to the voltage across one of said reactors, rectifying means connected for superposing on the alternating voltage component a substantially uniform direct voltage component of magnitude in relation with the magnitude of the voltage of another of said reactors, and means responsive to the magnitude of the flow of current through said valve for controlling the inductance of the first said reactor.

13. In an electric translating system, an alternating current winding, an electric valve connected with said winding and having an anode with an associated control electrode and a cathode, and a circuit connected for receiving an alternating voltage porportional to a voltage of said winding and including a second alternating current winding, a rheostat and a plurality of reactors, means for impressing an alternating voltage component between said control electrode and said cathode proportional to the voltage across the second said winding and said rheostat, rectifying means connected for superposing on the alternating voltage component a substantially uniform direct voltage component substantially proportional to the voltage across one of said reactors, and means responsive to the magnitude of the output voltage of said system for controlling the inductance of said one of said reactors.

14. In an electric translating system, an alternating current winding, an electric valve connected with said winding and having an anode with an associated control electrode and a cathode, and a circuit connected for receiving an alternating voltage similar to a voltage of said winding and including a second alternating current winding serially connected with a rheostat and a plurality of reactors and having a midtap, means connected between the midtap of the second said winding and the point of junction between said rheostat and one of said reactors for impressing an alternating voltage component from said circuit between said control electrode and said cathode, rectifying means connected across said one of said reactors for superposing a substantially uniform direct voltage component therefrom on the alternating component, and means responsive to an operating condition of said system for varying the inductance of the said one of said reactors.

15. In an electric translating system, an alternating current winding, an electric valve connected with said winding and having an anode with an associated control electrode and a cathode, a circuit connected for receiving a periodic voltage similar to a voltage of said winding and including a plurality of impedance elements, means connected with said circuit for impressing an alternating voltage component therefrom between said control electrode and said cathode, rectifying means connected with said circuit, a resistor connected with said rectifying means and with said control electrode for receiving a substantially uniform and constant direct current voltage, means for connecting said resistor with said cathode to cause impression of a unidirectional voltage component between said control electrode and said cathode, and means responsive to an operating condition of said valve for simultaneously varying one of said impedance elements and varying the connection of said resistor with said cathode to regulate the flow of current through said valve.

HAROLD WINOGRAD.